(12) United States Patent
Mirbagheri et al.

(10) Patent No.: US 8,411,771 B2
(45) Date of Patent: Apr. 2, 2013

(54) PREDICTIVE CLIPPING IN MULTI-CARRIER WIRELESS COMMUNICATION SYSTEMS

(75) Inventors: Arash Mirbagheri, San Diego, CA (US); Brian C. Banister, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 137 days.

(21) Appl. No.: 12/782,871

(22) Filed: May 19, 2010

(65) Prior Publication Data

US 2011/0286550 A1 Nov. 24, 2011

(51) Int. Cl.
*H04K 1/10* (2006.01)

(52) U.S. Cl. ........ 375/260; 375/267; 375/316; 375/345; 375/346; 375/296

(58) Field of Classification Search .................. 375/260, 375/267, 296, 345, 346; 370/203, 204, 205, 370/208, 209, 210
See application file for complete search history.

(56) References Cited

U.S. PATENT DOCUMENTS

| 6,687,238 | B1 | 2/2004 | Soong et al. | |
| 7,974,581 | B2 * | 7/2011 | Okada et al. | 455/46 |
| 2005/0117666 | A1 * | 6/2005 | Paul et al. | 375/317 |
| 2011/0286550 | A1 | 11/2011 | Mirbagheri et al. | |

FOREIGN PATENT DOCUMENTS

| EP | 1198088 A1 | 4/2002 |
| EP | 1213864 A1 | 6/2002 |
| EP | 1311097 A1 | 5/2003 |
| EP | 1360760 A2 | 11/2003 |
| EP | 1659722 A1 | 5/2006 |
| WO | WO2004051952 A1 | 6/2004 |

OTHER PUBLICATIONS

International Search Report and Written Opinion—PCT/US2011/037214—ISA/EPO—Nov. 7, 2011.

* cited by examiner

*Primary Examiner* — Dhaval Patel
(74) *Attorney, Agent, or Firm* — S. Hossain Beladi

(57) ABSTRACT

A method and apparatus for selectively clipping waveforms prior to transmission in a multi-carrier wireless communication system is provided. The design includes estimating peak values of the composite multi-carrier signal, determining a local threshold set including one local threshold for each carrier based on a configurable total threshold representing a maximum aggregate signal level for a sum of all signals to be transmitted over the multiple carriers, and clipping one signal to be transmitted over one carrier when the signal exceeds a corresponding local threshold and a sum of all signals to be transmitted over multiple carriers exceed the total threshold. Alternately, the design may include estimating peak signal values for signals to be transmitted in the multi-carrier system, and selectively clipping any signal wherein at least one peak signal value exceeds a local threshold and peak signal values for a sum of all signals to be transmitted exceed a global threshold.

50 Claims, 11 Drawing Sheets

PREDICTIVE CLIPPING IN MULTI-CARRIER WIRELESS COMMUNICATION SYSTEMS

BACKGROUND

I. Field

The present design relates generally to the art of wireless communication systems, and more specifically to reducing variations in signals transmitted in a multi-carrier wireless environment.

II. Description of the Related Art

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems.

The 3GPP2 design includes the Evolution-Data Optimized (EV-DO) telecommunications standard, typically employed for broadband Internet access. EV-DO is an evolution of the CDMA2000 standard that supports high data rates and can be deployed with a wireless carrier's voice services. EV-DO standards have included Release 0, Revision A, and Revision B, wherein Rev. B is a multi-carrier evolution of the Rev. A standard. Other competing broadband Internet wireless standards exist, including but not limited to the UMTS standard.

In multi-carrier environments, including but not limited to the EV-DO environment, the peak-to-average ratio (PAR) of a modulated waveform is a metric used to assess transmission performance of a modulated waveform. PAR is sometimes called PAPR, or peak-to-average power ratio, and as used herein, such terms are interchangeable. PAR represents the ratio of the peak value of a signal compared to the average value of the signal. If a modulated signal has a relatively high PAR, the transmitter must perform specific processing to avoid clipping, i.e. reducing the peak values of the transmitted waveform, which is undesirable. Transmission of the full modulated waveform, without reduction, is generally preferred. Additional processing by the transmitter chip to reduce peak values results in a need for additional hardware resources, or in simple terms, requires additional work by the transmitter chip.

Previous systems have addressed issues associated with higher PAR values by employing waveform clipping techniques. Single carrier waveform predictive clipping has been used successfully in wireless communication systems employing single-carrier UMTS technology. In a single carrier arrangement, such predictive clipping is straightforward, in that peak estimation filters are followed by a clipping structure in the transmission sequence. An example of predictive clipping in the single carrier case is provided in FIG. 1, described in detail below.

In a multi-carrier environment, decisions as to where and how to implement predictive clipping functions are more complex in that the predictive clipping components must independently operate in conjunction with the downstream components to effectively and efficiently reduce PAR values in the presence of multiple waveforms. Each carrier stream in a multi-carrier arrangement is independent of the other carrier streams. The overall goal is to reduce the PAR of the aggregate signal, but the peak of any single carrier may or may not contribute to the peak of the aggregate signal. Therefore, simple use of multiple predictive clipping components may not reduce the PAR for all signals transmitted in a multi-carrier environment.

There is therefore a need in the art for techniques and devices that can effectively reduce the overall aggregate PAR of modulated waveforms transmitted in multi-carrier wireless communication networks.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The present design includes selectively clipping waveforms prior to transmission in a multi-carrier wireless communication system is provided. The design includes estimating peak values of the composite multi-carrier signal, determining a local threshold set including one local threshold for each carrier based on a configurable total threshold representing a maximum aggregate signal level for a sum of all signals to be transmitted over the multiple carriers, and clipping one signal to be transmitted over one carrier when the signal exceeds a corresponding local threshold and a sum of all signals to be transmitted over multiple carriers exceed the total threshold.

Alternately, the design may include estimating peak signal values for signals to be transmitted in the multi-carrier system, and selectively clipping any signal wherein at least one peak signal value exceeds a local threshold and peak signal values for a sum of all signals to be transmitted exceed a global threshold.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "an example" or "exemplary" is not necessarily to be construed as preferred or advantageous over other implementations.

Systems and methods are provided to facilitate wireless communications and in particular wireless transmissions. In one aspect, a wireless communications method is provided for predictive clipping of modulated waveforms in a multi-carrier environment. The design provides delayed waveform samples received over one of a plurality of carriers to a plurality of different phase pulse shaping filters to form a plurality of pulse shaped signals, obtains magnitudes of the plurality of pulse shaped signals, sums the magnitudes of the pulse shaped signals with magnitudes of other pulse shaped signals of other carriers to form a plurality of different phase magnitude sums, determines a maximum phase magnitude sum from the plurality of different phase magnitude sums, and clips those waveforms when the maximum phase magnitude sum exceeds a threshold.

Figure 1:
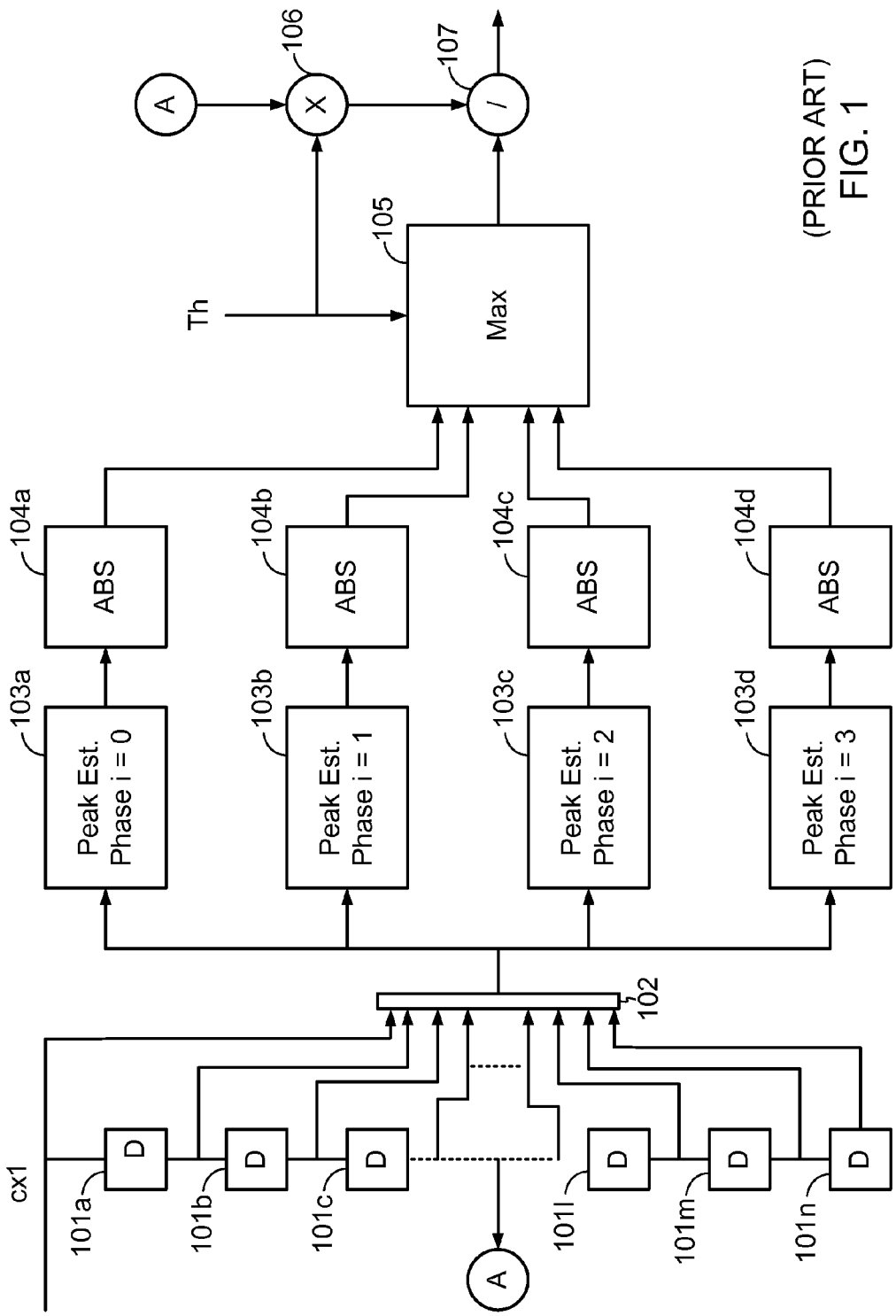
FIG. 1 illustrates predictive clipping employed in a single carrier wireless communication network.

FIG. 1 illustrates an example of a circuit employing predictive clipping for transmission over a single carrier. Predictive clipping is the hard clipping of chip samples after peak estimation filtering and comparing the magnitude of all possible signal phases with a threshold. From FIG. 1, the circuit delays received chip samples using delay arrangement 101, including individual delays 101a through 101n. Any number of delay elements may be employed depending on the circumstances and implementation. The circuit provides original chip samples and the delayed versions of the samples to bus 102. Bus 102 provides delayed signals to four peak estimation filters 103a-d having phases i=0 through 3. More or fewer peak estimation filters may be employed, again depending on implementation and circumstances. Absolute value components 104a-d determine the absolute values or magnitudes of the signals received from the peak estimation filters 103a-d. More or fewer absolute value components may be employed, typically having a one-to-one correspondence with the peak estimation filters 103a-d. Note that in FIG. 1, as well as other drawings provided herein, thicker lines between elements represent buses carrying a group of signal lines.

Upon computing the absolute values or magnitudes of the signals, absolute value components 104a-d provide all values to maximum value determination block 105. Determination block 105 determines the maximum value received. The system applies a threshold "Th" to the maximum value determination block 105 as well as to multiplier 106. As shown in FIG. 1, the delayed values are provided as shown by encircled letter A to multiplier 106, and these delayed values are thus multiplied by the threshold. Multiplier 106 provides the multiplied results to divider 107, which divides the maximum value from maximum value determination block 105 by the multiplied values from multiplier 106, wherein these components form a clipping arrangement and clip the signal.

In the construction of FIG. 1, if the highest magnitude from maximum value determination block 105 exceeds the threshold "Th," the circuit clips the corresponding chip sample such that its magnitude is constrained at the threshold level. Otherwise, the chip sample passes unchanged through the circuit shown.

Figure 2:
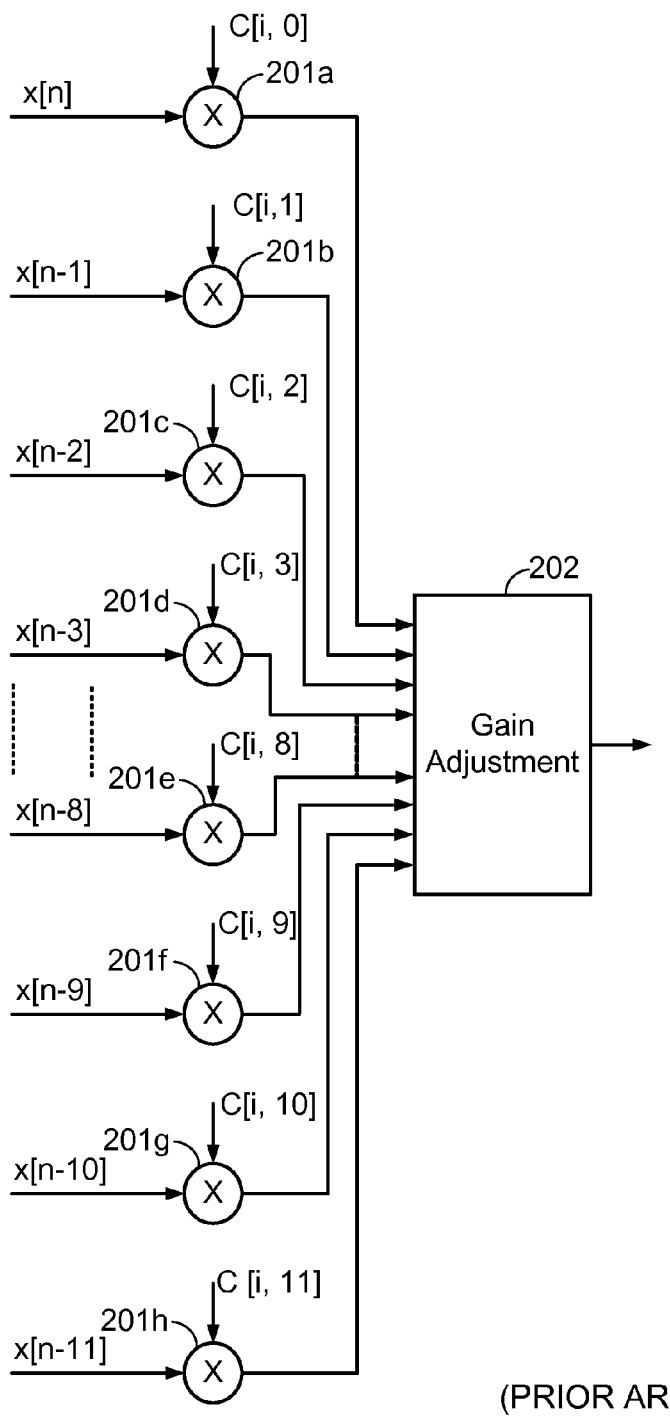
FIG. 2 is a peak estimation filter based on a CDMA pulse shape.

FIG. 2 shows an example of a peak estimation filter, such as one of the peak estimation filters 103a-d of FIG. 1. For CDMA technology, the standard body 3GPP2 has adopted the pulse shaping filter with 48 coefficients, oversampling from chip rate to four times the chip rate, resulting in four sampling phases. In FIG. 2, twelve inputs are received, multiplied by C[i,n] at a respective one of the multipliers 201a-h in the implementation shown, and all of these values are summed at summer 202. The table illustrated provides the values of C[0,:] through C[3,:] and includes twelve values used for multiplication, or 48 coefficients. The sum of all of these multiplications is then shifted left nine bits at left shifter 203, and the circuit provides the values of the resultant signal to an absolute value block such as one of absolute value components 104a-d.

Examples of the 48 filter coefficients may be found in various 3GPP2 specifications, such as 3GPP2 C.S0024-B. Selected acceptable values for the 48 coefficients disclosed in that 3GPP2 document are presented in FIG. 2, and these values can be employed as the coefficients C[i,0] through C[i,11] for i=0 to 3. Other sets of coefficients, such as with fewer than 48 values, may be employed depending on the specific implementation.

The absolute value function may be computed in various ways, but in general, the signal from the estimation filters 103a-d is provided in in-phase (I) and quadrature (Q) components, and the absolute value block computes the square root of the sum of $I^2$ plus $Q^2$. Such absolute value functions are known in the field.

Figure 3:
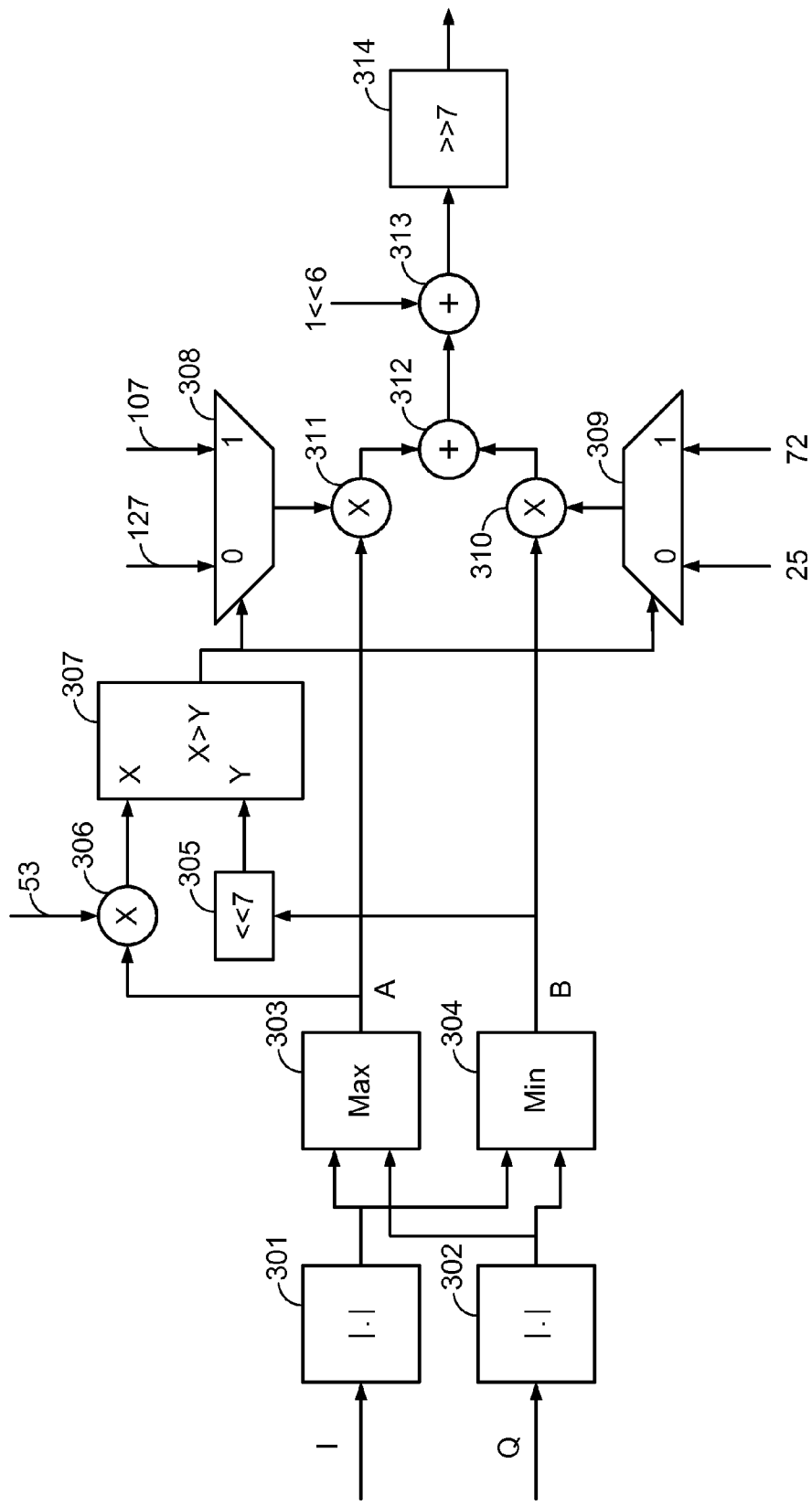
FIG. 3 illustrates an example of an absolute value function implementation.

FIG. 3 illustrates one possible fixed point implementation of an absolute value function that may be employed as one of the absolute value components 104a-d. From FIG. 3, the signal is received as in phase and quadrature components, and blocks 301 and 302 determine magnitudes of the in-phase and quadrature phase components, respectively. Max block 303 and min block 304 assess the maximum values and minimum values of magnitudes received from blocks 301 and 302. On the minimum path, the value from minimum block 304 passes to shift block 305, which shifts bits left seven places. On the max path, the maximum value determined passes to multiplier 306, which multiplies the value received by 53 (binary 00110101).

The circuit then compares values received from multiplier 306 and shift block 305, and if the value from multiplier 306 is greater than the value from shift block 305, the circuit sets the value "1" at multiplexers 308 and 309, indicating use of values 107 (decimal) for multiplexer 308 and 72 (decimal) for multiplexer 309. If the value from multiplier 306 is not greater than the value from shift block 305, the other values illustrated (decimal) are employed. Multiplier 310 multiplies the min value from min block 304 by the output of multiplexer 309, while multiplier 311 multiplies the output from max block 303 by the output from multiplexer 308. Summer 312 sums outputs from multiplier 310 and 311. The resultant value is summed at summer 313 with 1 shifted to left by 6 bits, or in other words, decimal 64. Block 314 right shifts the result seven places. The result is an absolute value function, the square root of the sum of $I^2$ plus $Q^2$, with small and generally negligible error.

Multi-Carrier Predictive Clipping

Predictive clipping in a multi-carrier environment may be performed in various ways. One potential solution is replicating the predictive clipping structure of FIG. 1 for each carrier branch, and allowing the replicated predictive clipping components to function independently of one another, each with programmable thresholds. One advantage to such replication of the single carrier circuitry is that such predictive clipping has no impact on spurious emissions.

Results of a simulation of independent predictive blocks in a multi-carrier environment are shown in Table 1, where the threshold for each branch, or each independent set of predictive clipping components, is independently tunable based on a per-carrier scaling of that carrier. Rho in Table 1 represents the waveform quality and is a general measurement understood to those skilled in the art, where a rho value closer to 1.0 represents a higher quality signal. The three values represented include one, two, and three carriers (1× DO, 2× DO, and 3× DO).

TABLE 1

Performance of independent predictive clipping blocks

| Case | No Clipping | | Clipping to reduce PAR by 0.5 dB | | Clipping to reduce PAR by 1.0 dB | |
|---|---|---|---|---|---|---|
| | PAR | Rho | PAR | Rho | PAR | Rho |
| 1xDO | 6.2 | 0.999 | 5.7 | 0.998 | 5.2 | 0.997 |
| 2xDO | 7.4 | 0.999 | 6.9 | 0.987 | 6.4 | 0.975 |
| 3xDO | 7.8 | 0.999 | 7.3 | 0.975 | 6.8 | 0.936 |

From Table 1, to significantly reduce PAR, individual carriers must be drastically clipped when independent predictive clipping blocks are employed. The result of such clipping is a significant degradation in rho.

The present design seeks to address these PAR and rho issues based on two general aspects associated with a multi-carrier implementation. First, in a multi-carrier transmission, the PAR of the aggregate signal is independent of carrier frequencies. PAR is determined based on the number of carriers, the modulation of data streams on each carrier, and the relative power of the carriers. Relative frequency of carriers is of no consequence in PAR. Second, in a multi-carrier transmission, the sum of magnitudes of carrier signals generally tracks the magnitude of the sums of the signals.

If the waveforms for carriers 1, 2, and 3 are denoted A, B, and C, respectively, by invoking the Schwartz inequality, the magnitude of A+B+C (the aggregate signal) is less than or equal to the magnitude of A plus the magnitude of B plus the magnitude of C (the sum of magnitudes). Thus an upper bound on the peak of the magnitude of the aggregate signal is provided by the sum of the magnitudes. The high frequency nature of the aggregate signal requires certain processing, as the sum of magnitudes does not exhibit the same high frequency performance as the aggregate signal.

In the present design, when the sum of magnitudes exceeds a global threshold, the condition to clip at least one of waveforms A, B and C has been met, but violation or exceeding of the global threshold is not the sole condition to clip waveforms A, B, and/or C. The system then compares individual carriers with a local (channel) threshold, and when both the global and local thresholds are exceeded, the system can clip the individual carriers.

Figure 4:
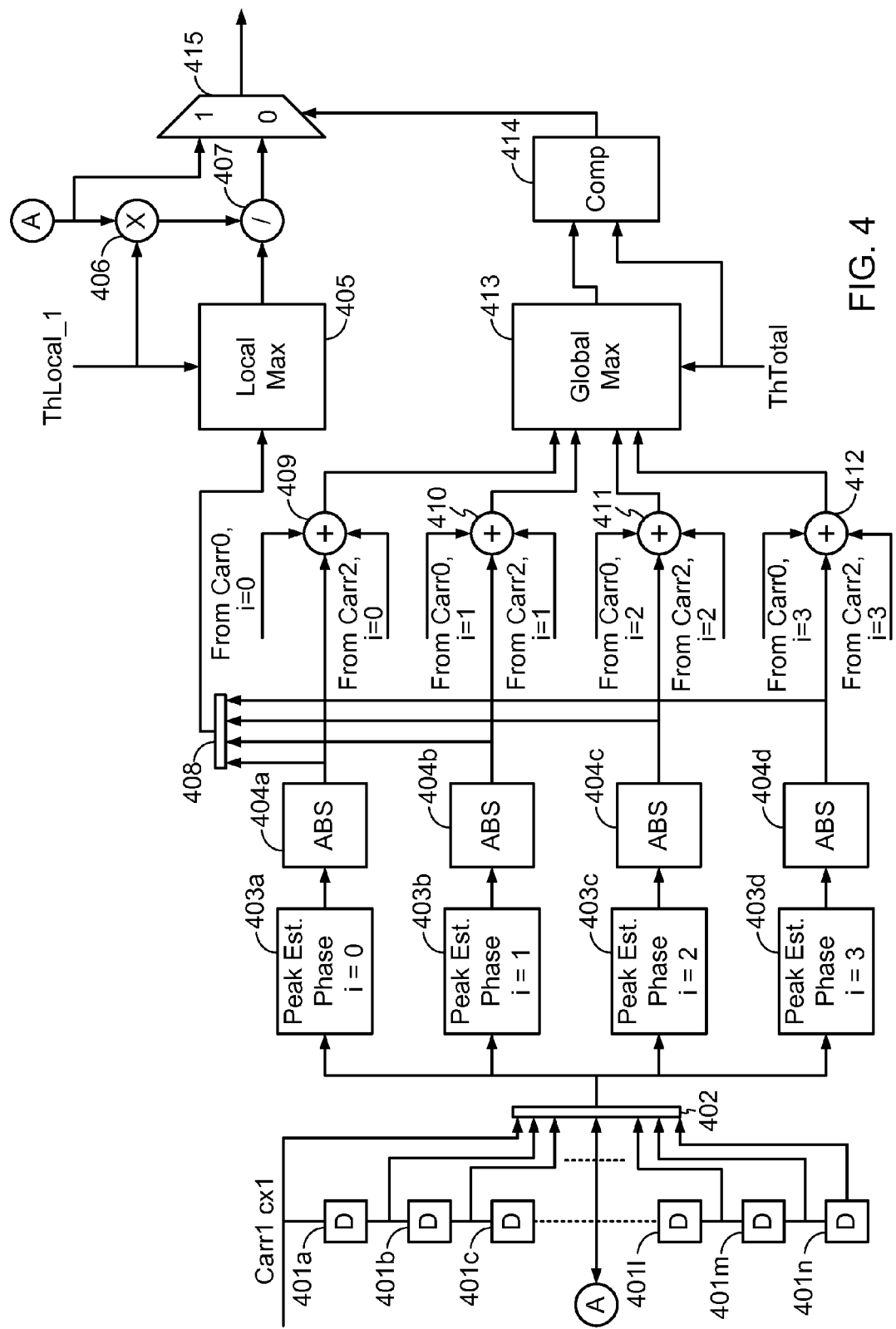
FIG. 4 shows a predictive clipping design for a multi-carrier transmitter.

FIG. 4 illustrates a first embodiment of predictive clipping for a multi-carrier communication system, here a three carrier system. The blocks of FIG. 4 represent the blocks from carrier system 1 (Carr1); carriers 0 and 2 are not shown in FIG. 4, but include similar components, and as may be seen, the Carr1 implementation receives certain signals from Carr0 and Carr2.

From FIG. 4, the received chip samples are delayed by the delay arrangement 401, including individual delays 401a through 401n. Again, any number of delays may be employed, and the number of delays may depend on the number of coefficients used for peak estimation, which depends on the pulse shape coefficients. The system provides chip samples and the delayed versions of the samples to bus 402. Bus 402 provides all delayed signals to four peak estimation filters 403a-d having phases i=0 through 3. More or fewer peak estimation filters may be employed. Absolute value components 404a-d determine the absolute values or magnitudes of the signals received from the peak estimation filters 403a-d. More or fewer absolute value components may be employed, typically having a one-to-one correspondence with the peak estimation filters 403a-d.

Upon computing the absolute values or magnitudes of the signals, absolute value components 404a-d provide all absolute values to bus 408 and to local maximum value determination block 405. Maximum value determination block 405 determines the local maximum signal value received. The system applies a local threshold ThLocal_1 to the local maximum value determination block 405 as well as to multiplier 406. Again, the delayed values are provided as shown by encircled letter A. The system provides these delayed values to multiplier 406, and these delayed values are thus multiplied by the local threshold ThLocal_1. Multiplier 406 provides the multiplied results to divider 407. Divider 407 divides the maximum value from local maximum value determination block 405 by the multiplied values from multiplier 406.

Components 409-414 represent functions not shown in FIG. 1, and only one set of these components is required for all carriers (here, the three carriers 0, 1, and 2) while the other components in FIG. 4 (401a-n, 402, 403a-d, 405, 406, 407, 408, and 415) are replicated for each carrier. Summers 409, 410, 411, and 412 sum the values from absolute value components 404a-404d with corresponding absolute values from the other branches, each branch associated with a channel. For example, summer 409 sums the output of absolute value block 404a with the absolute value block results from carrier 0 and carrier 2 for phase i equal to 0. The same is done for phases one, two, and three at summers 410, 411, and 412, respectively, namely summing the absolute values from other channels with the absolute values for carrier one for the respective phases. Global maximum value block 413, of which there is only one in the multi-carrier arrangement, determines the global maximum value of the results of summers 409 through 412, and global threshold ThTotal is applied to maximum value block 413.

Comparison block 414 performs a comparison—if the magnitude of the output of each of channels 0, 1, and 2 does not exceed the global threshold ThTotal or the magnitude of each individual carrier does not exceed ThLocal (in other words, the maximum absolute value from max block 405 does not exceed ThLocal_1 for carrier 1, corresponding maximum absolute value from carrier 0 max block (not shown) does not exceed ThLocal_0, and absolute value from carrier 2 max block (also not shown) does not exceed ThLocal_2), the result is a "one" value passing to multiplexer 415 and the corresponding multiplexers from the other carriers, indicating the samples from each carrier pass through unchanged. If both the global value ThTotal is exceeded and one or more of the channel thresholds ThLocal_0, ThLocal_1, and ThLocal_2 is exceeded, the value of "0" passes to carrier one multiplexer 415 and/or other carrier multiplexers, clipping the signal for the respective carrier or carriers using divider 407 or a similar component present in each carrier branch.

If only a single carrier is operating or used, the illustration of FIG. 4 is functionally identical to the device shown in FIG. 1. Thresholds ThTotal and ThLocal_i, for i equal to 0, 1, and 2, are generally programmable using firmware and/or software and may be set based on circumstances encountered. Timing of these thresholds may be locked or synchronized with the timing of per-carrier scaling factors, Beta. One relationship between ThTotal and ThLocal_i is shown in Equation (1):

$$ThLocal\_i = \frac{\beta_i}{\sum_j \beta_j} * ThTotal \quad (1)$$

where i is the individual carrier number, j is the total number of carriers, and β is a per-carrier scaling factor, with 1.0 being normal scaling. Scaling factors may be based on relative power or PAR values or any other acceptable scaling coefficient differentiating the carriers in the multi-carrier arrangement.

An alternative to the computation of Equation (1) is to clip more from a stronger, or higher powered, carrier while not changing the lower power carrier thresholds. Such an approach can be useful in non-equal power scenarios wherein a stronger carrier contributes more to the PAR. However, these thresholds may be computed in any acceptable way, and thus dynamic alteration via software or firmware may be implemented.

Figure 5A:
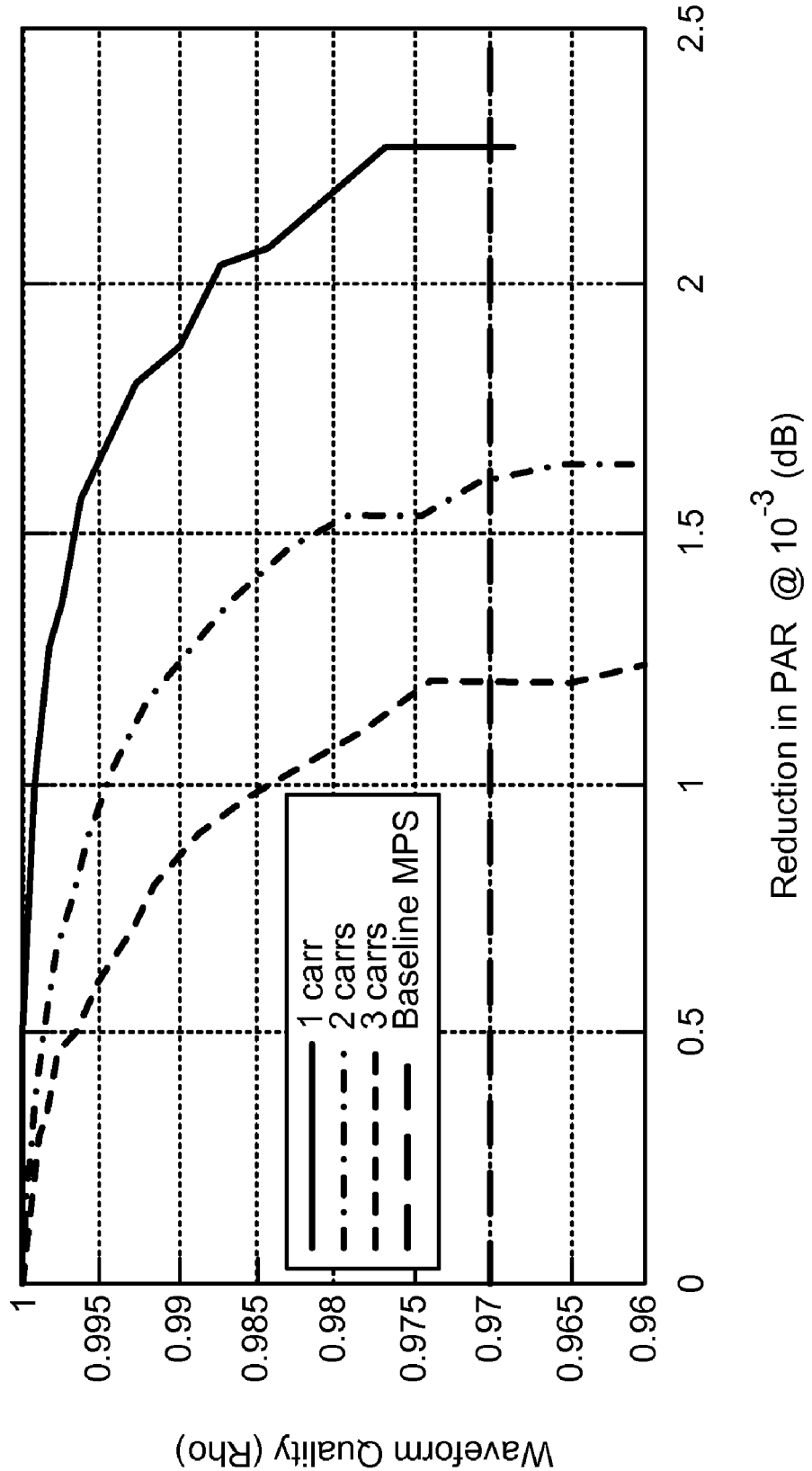
FIG. 5A shows a comparison of PAR values without predictive clipping employed, in both single and multiple carrier applications.
Figure 5B:
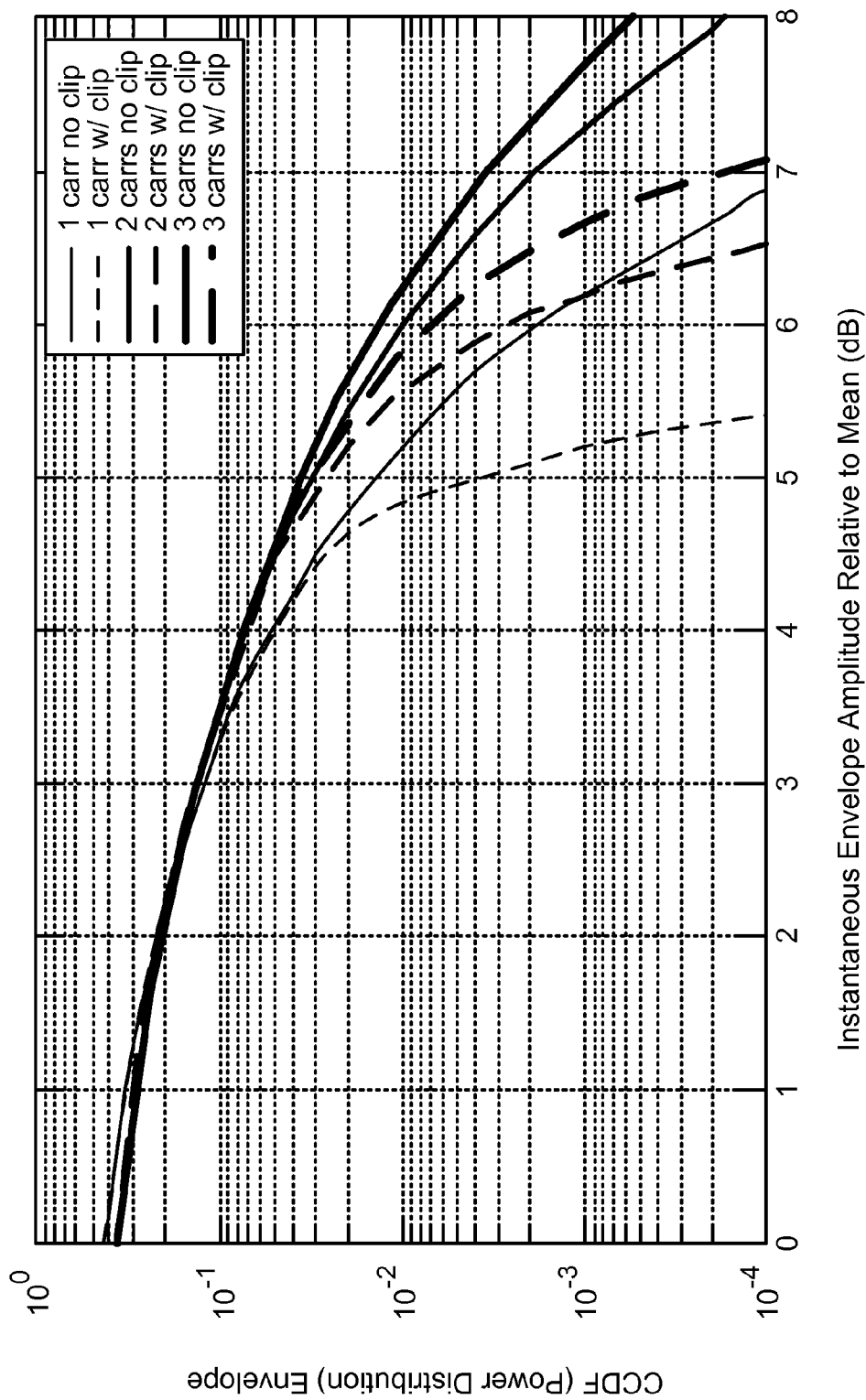
FIG. 5B illustrates the benefit of predictive clipping in single and multiple carrier applications

FIG. 5A illustrates the baseline degradation of rho, or waveform quality, as a function of a reduction in PAR (dB) at probability $10^{-3}$ for single carrier, two carrier, and three carrier cases in an example configuration, i.e. a configuration according to one of the embodiments presented herein. A value of PAR of X dB at probability $10^{-3}$ means the probability that signal peaks exceed the average value by X dB or more is $10^{-3}$. In multi-carrier cases, carriers are of equal power. Using a multi-carrier design such as that shown in FIG. 4, PAR can in certain instances be reduced by 1.0 dB while maintaining a waveform quality in excess of 0.980. Increasing the threshold and clipping beyond a certain point becomes ineffective as waveform quality falls off without significant further reduction in PAR. FIG. 5B illustrates an example of the PAR curve before and after clipping for one carrier, two carriers, and three carriers when the threshold in each case set such that PAR is reduced by 1.0 dB.

Predictive Multi-Carrier Clipping Using Threshold Compute Engine

One additional embodiment of the present design employs dynamic adjustment of local thresholds for each active carrier based on desired clipping of the aggregate multi-carrier signal and the instantaneous relative power of the active carriers.

Higher powered carriers can dominate PAR, so clipping the higher powered carriers can be more effective in reducing PAR. As instantaneous carrier power changes from sample to sample, the system can clip the strongest carrier to the level of the second strongest carrier. If more clipping is still needed, the system may clip the two carriers equally until they reach the power level of the third strongest carrier, and so forth In this way, for any given chip sample, the low-powered carriers are not clipped until necessary thereby preserving their waveform quality as much as possible.

Figure 6:
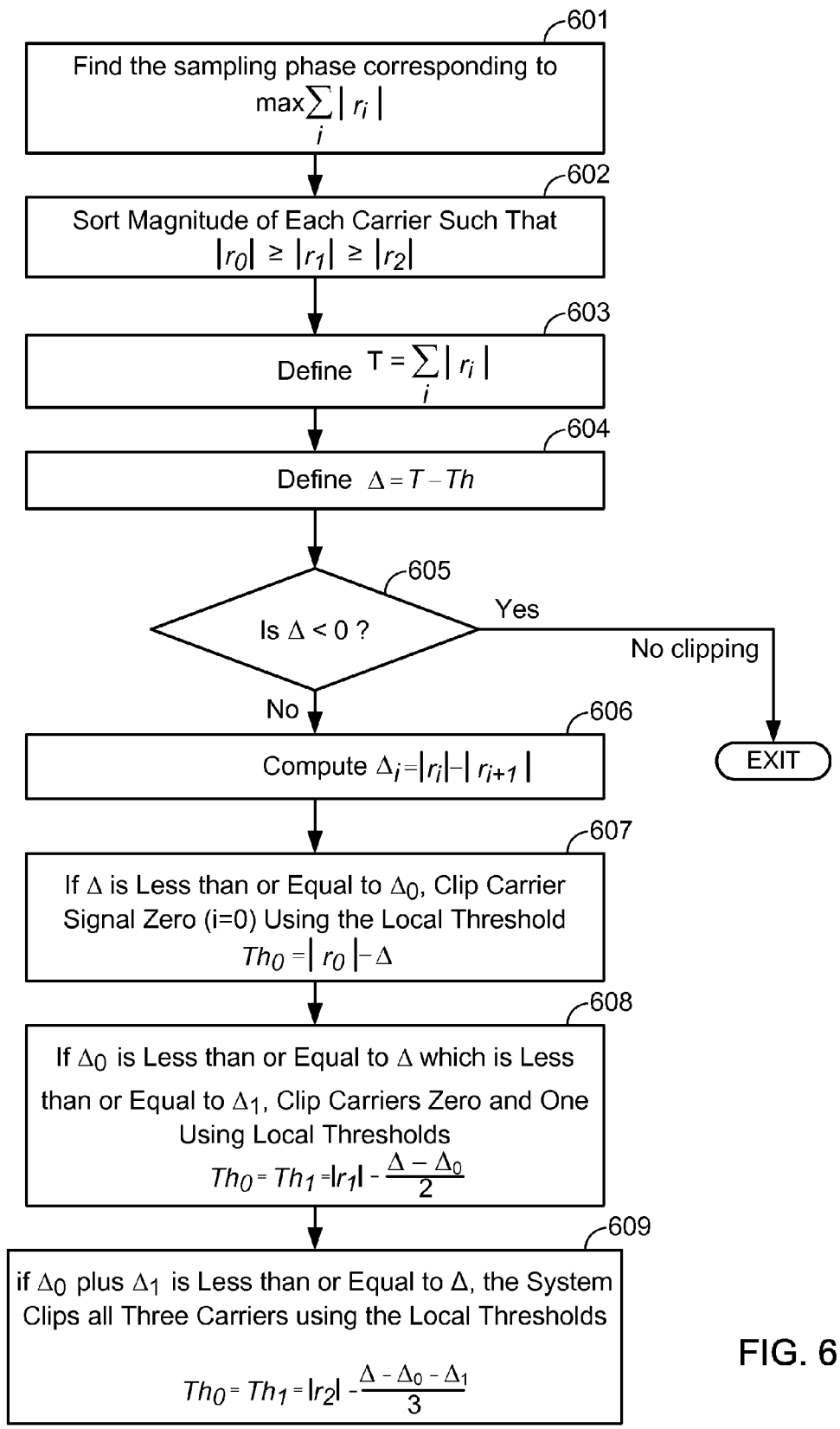
FIG. 6 is a flowchart for computing a local threshold, as may be implemented in a threshold computing engine in accordance with one aspect of the present design.

An embodiment illustrating processing in such a threshold computation engine is shown in FIG. 6. FIG. 6 and the discussion presented are for three active carriers, and the teachings presented can be extended to any number of carriers. From FIG. 6, point 601 shows finding the sampling phase that corresponds to:

$$\max \sum_i |r_i| \quad (2)$$

where r represents the signal received and i represents the carrier number. Point 602 sorts the magnitude of each active carrier such that:

$$|r_0| \geq |r_1| \geq |r_2| \quad (3)$$

Point 603 defines T, where T is defined as:

$$T = \sum_i |r_i| \quad (4)$$

Point 604 defines:

$$\Delta = T - Th \quad (5)$$

where Th is the configurable global threshold.

At point 605, if Δ is less than zero, no clipping occurs, and the program exits. At point 606, the engine computes:

$$\Delta_i = |r_i| - |r_{i+1}| \quad (6)$$

for i=0, ..., N-2, where N=3 in a three carrier arrangement. At point 607, if Δ is less than or equal to $\Delta_0$, the system clips to zero carrier signal (i=0) using the local threshold:

$$Th_0 = |r_0| - \Delta \quad (7)$$

At point 608, if $\Delta_0$ is less than or equal to Δ which is less than or equal to $\Delta_1$, carriers zero and one are clipped using local thresholds:

$$Th_0 = Th_1 = |r_1| - \frac{\Delta - \Delta_0}{2} \quad (8)$$

At point 609, if $\Delta_0$ plus $\Delta_1$ is less than or equal to Δ, the system clips all three carriers using the following local thresholds:

$$Th_0 = Th_1 = Th_2 = |r_2| - \frac{\Delta - \Delta_0 - \Delta_1}{3} \quad (9)$$

Figure 7:
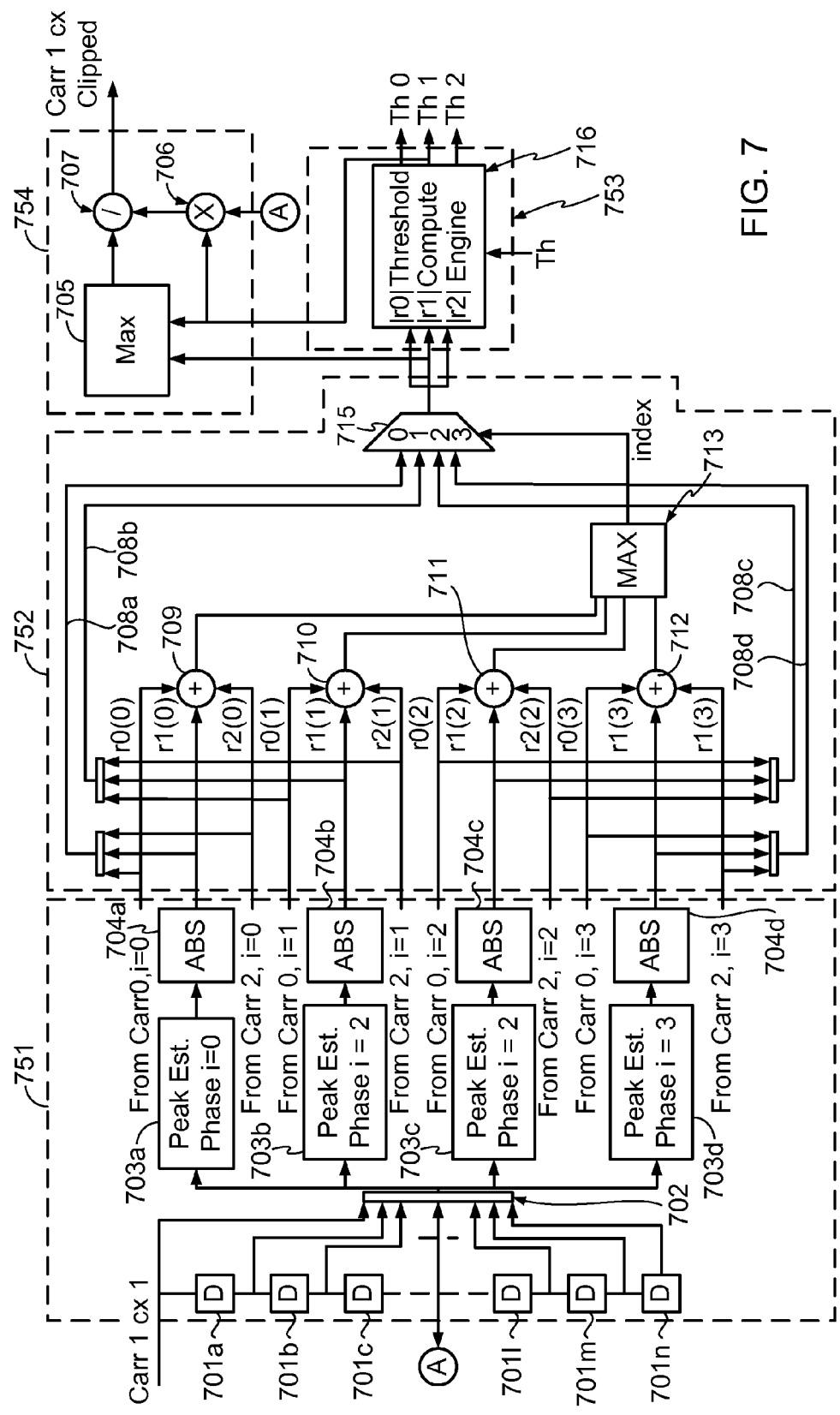
FIG. 7 illustrates a multi-carrier predictive clipping design using a threshold compute or computing engine.

FIG. 7 illustrates a further embodiment including a threshold compute engine to dynamically compute thresholds, such as according to Equations (2) through (9) above. Certain elements of FIG. 7 are similar or identical to those of FIG. 1. From FIG. 7, peak estimation filter circuitry 751 provides peak estimation signals to circuitry 752. Circuitry 752 is configured to select the phase having the largest peak, which in turn provides signals to threshold compute engine circuitry 753 and clipping arrangement 754, which clips the signals where appropriate.

In general, throughout FIG. 7, thicker lines are employed between components to indicate more than one signal or data stream is provided, or in other words, buses carrying multiple signals. For example, buses 708a-d provide multiple signals to multiplexer 715.

From FIG. 7, the carrier received chip samples are delayed by the delay arrangement 701, including individual delays 701a through 701n. Again, any number of delays may be employed. The number of coefficients used for peak estimation depends on the pulse shape coefficients. Bus 702 receives the chip samples and the delayed versions of the samples and provides a single output of all delayed signals to four peak estimation filters 703a-d having phases i=0 through 3, and more or fewer than four peak estimation filters may be employed. Absolute value components 704a-d determine the absolute values or magnitudes of the signals received from the peak estimation filters 703a-d, and may employ components similar to those shown in FIG. 3. More or fewer absolute value components may be employed, typically having a one-to-one correspondence with the peak estimation filters 703a-d.

Upon computing the absolute values or magnitudes of the signals, buses 708a-d receive all absolute values in the manner illustrated, with three values provided to each multiplexer. Summers 709, 710, 711, and 712 sum the values from absolute value components 704a-704d with corresponding absolute values from the other carrier branches. For example, summer 709 sums the output of absolute value block 704a with the absolute value block results from carrier 0 and carrier 2 for phase i equal to 0. The same is done for phases one, two, and three at summers 710, 711, and 712, respectively, namely summing the absolute values of signals from other carriers with the absolute values for carrier one for the respective phases. Maximum value block 713 determines the maximum value of the results of summers 709 through 712.

Maximum value block 713 provides the maximum value in the form of an index, correlated to phase, of the maximum signal received. In other words, if phase 0 provides the maximum signal, maximum value block 713 provides a value of zero. The maximum value block 713 provides this index to multiplexer 715, which allows the signal to pass corresponding to the index received. For an index of zero yielding the maximum value, for example, the multiplexer 715 passes r0(0), r1(0), and r2(0) (the components entering summer 709) to the threshold compute engine 716. These local thresholds are then fed to clipping circuitry of each carrier, in FIG. 7 the clipping circuitry is shown as clipping arrangement 754.

In one embodiment, the threshold compute engine 716 operates in accordance with the operation illustrated in FIG. 6. Clipping circuitry 754 includes a maximum value block, and the appropriate threshold determined from the threshold compute engine 716 is passed to the maximum value block 705, here threshold Th1, representing the threshold for carrier 1. If the dynamically computed threshold provided by threshold compute engine 716 is greater than the corresponding carrier signal provided to the threshold compute engine 716, the signal is not clipped. However, if the threshold is less than the received signal at threshold compute engine 716, the clipping circuitry 754 clips the signal using multiplier 706 and divider 707.

A single threshold compute engine 716 provides appropriate thresholds to appropriate components in each carrier branch, i.e. blocks corresponding to maximum value block 705 in each carrier branch. Also, the global threshold Th is provided to threshold compute engine 716, and this value, as shown in FIG. 6, is used to compute the individual carrier thresholds.

In the case of a single carrier, single band, only one instance of blocks 751, 752, and 754 is employed. Single band or single chain performance represents transmission over a single frequency band, while dual band or multiple band systems operate over two or multiple frequency bands, respectively. In single band operation, block 752 is significantly simplified in single carrier operation as discussed above. In the case of N concurrent carriers in a single transmission frequency band, the system employs N instances of blocks 751 and 754, with only a single instance of block 752 and of block 753. In the case of N concurrent carriers with all possible permutations in a dual frequency band transmission, the system employs N instances of blocks 751 and 754, with two instances of each of blocks 752 and 753.

Figure 8:
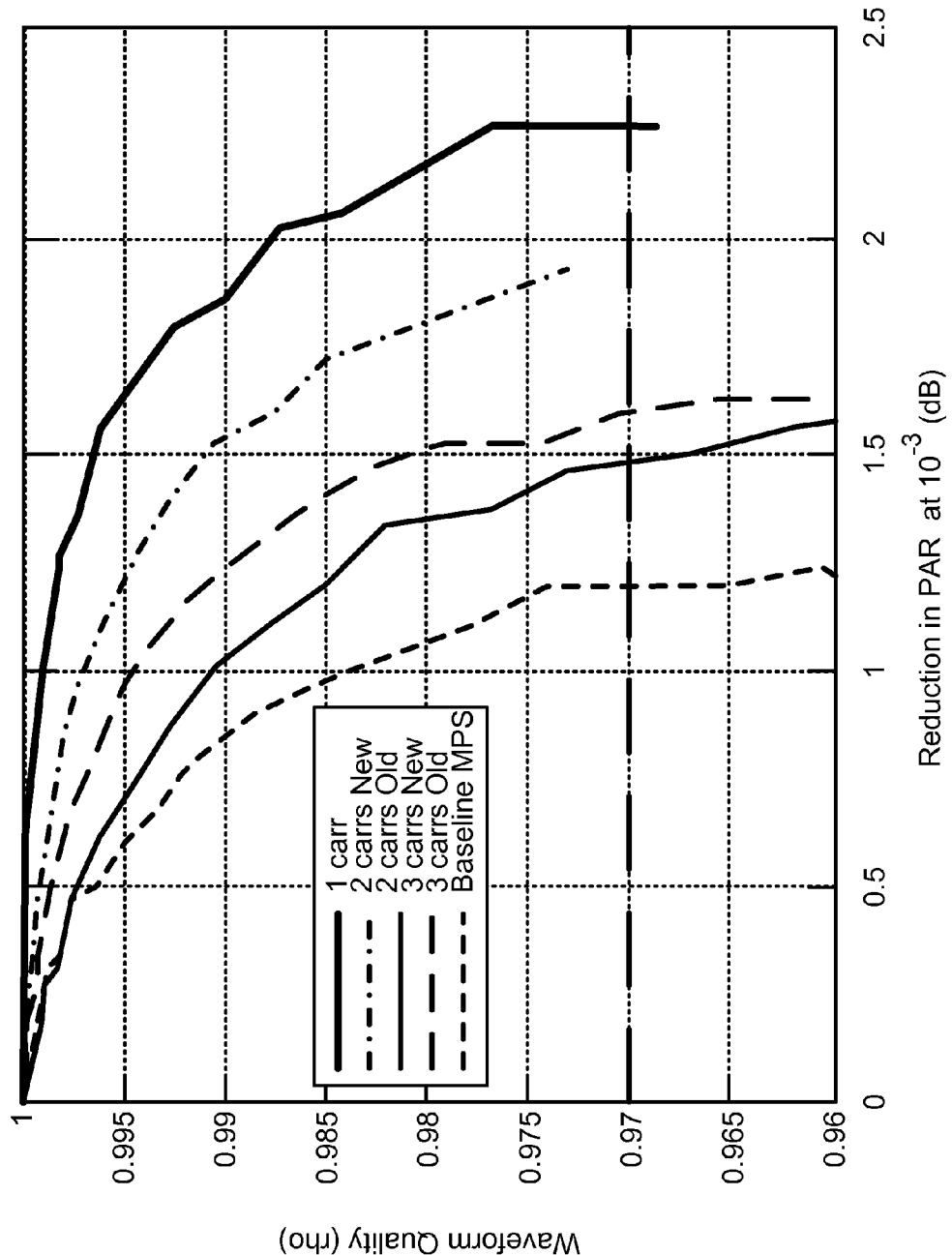
FIG. 8 shows a comparison of PAR values with predictive clipping employed, in both single carrier and multiple carrier applications.

FIG. 8 illustrates performance of a design employing a threshold compute engine such as that shown in FIGS. 6 and 7. The curves of FIG. 5 are also provided for reference. The net result is a greater reduction in PAR for a given rho when the system of FIGS. 6 and 7 is employed.

Figure 9:
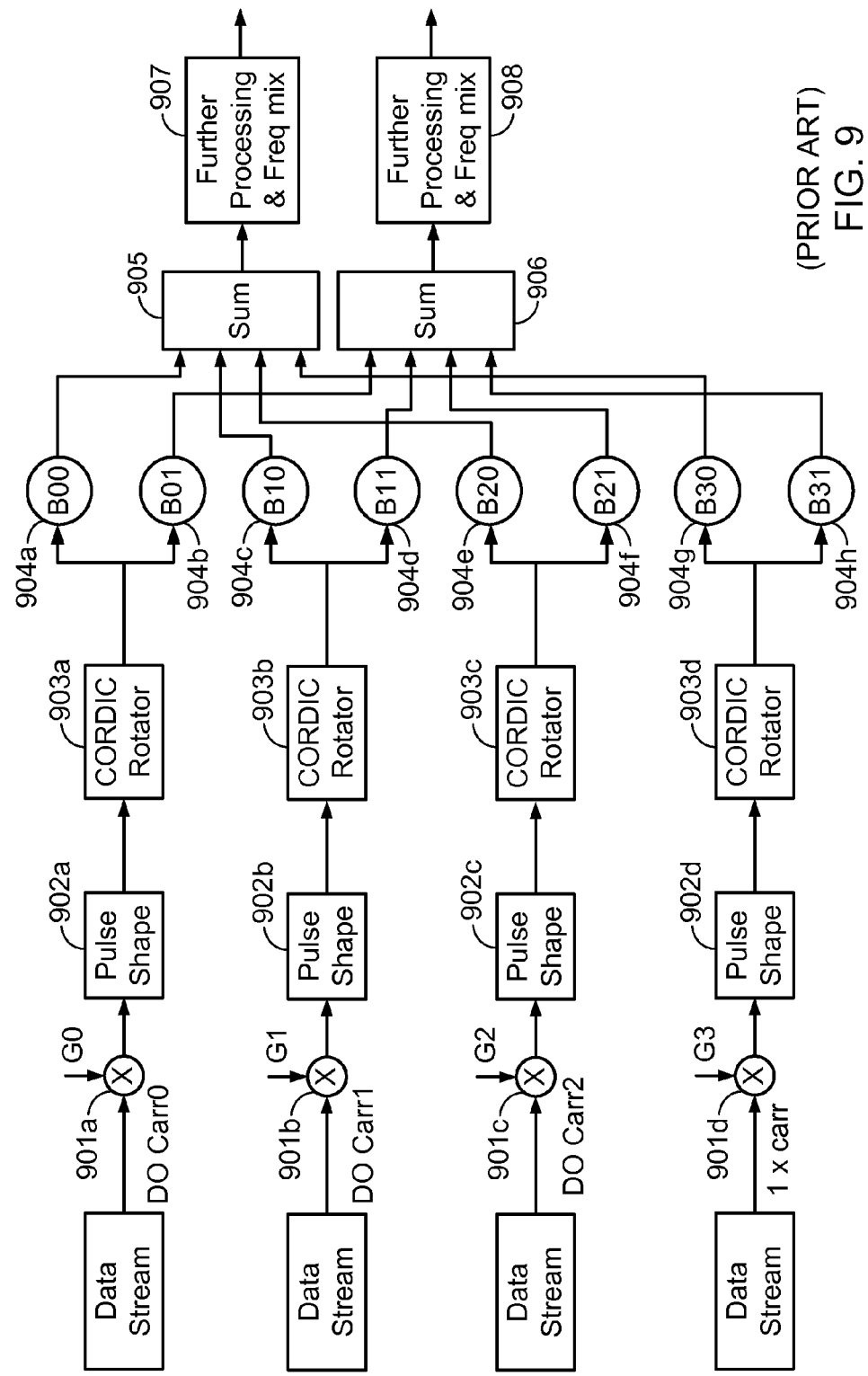
FIG. 9 is one example of an implementation of N concurrent carriers in a dual transmission frequency band, with N equal to four in the example provided.

FIG. 9 illustrates an embodiment of N concurrent carriers in a dual transmission frequency band, where N is equal to four. The circuit provides data in the form of a data stream over three DO carriers and a 1× carrier. Multipliers 901a-d receive scalar weights G0 through G3 to maintain the power differential between carriers and provide constant power distribution between carriers. Pulse shaping occurs at pulse shaping blocks 902a-d, followed by CORDIC rotators 903a-d. CORDIC rotators are shift-add algorithms that rotate vectors in a plane, wherein the CORDIC rotators perform a rotation using incremental rotation angles selected so that each angle of rotation is performed by a shift and add operation. Switches 904a-h are provided to permit or not permit output from the CORDIC rotators 903a-d, followed by two summing blocks 905 and 906. Further processing and frequency mixing occurs as shown by blocks 907 and 908.

Figure 10:
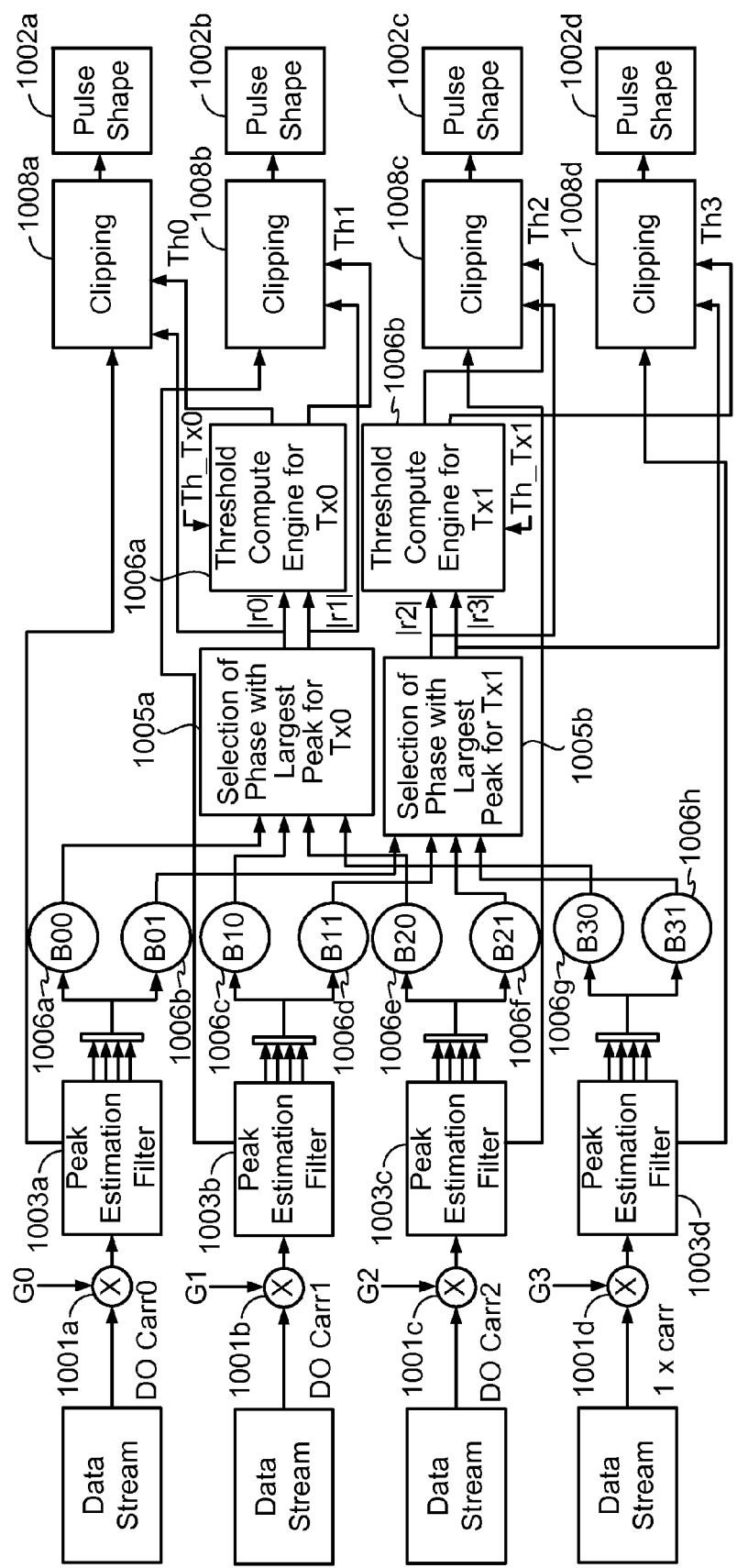
FIG. 10 illustrates one integration of the predictive clipping structure of FIG. 7 into the multi-carrier modulator transmit chain supporting four simultaneous carriers and dual transmit chains.

FIG. 10 illustrates an embodiment of the predictive clipping structure of FIG. 7 integrated into a dual-band modulator transmit chain, supporting four simultaneous carriers (3 DO and one 1× in this example). In FIG. 10, chain Tx0 carries two DO carriers and chain Tx1 carries one DO and one 1× carrier. Switches Bnn, shown as switches 1004a-h in FIG. 10, route the carrier signals to the block that selects the phase having peak magnitude. In this example, respective peak estimation filters 1103a-d provide the four phases corresponding to the first two DO carriers, grouped using buses 1007a-d, to the block 1005a corresponding to Tx0, and the four phases corresponding to the remaining 1× DO carrier to block 1005b corresponding to Tx1. Thus in effect, Tx0 block 1005a and Tx1 block 1005b have 2×4 inputs and two outputs. Similarly, the threshold compute engines 1006a for Tx0 and 1006b for Tx1 output two local thresholds based on independently controlled and software programmable global thresholds, Th_Tx0 and Th_Tx1. The lines directly connecting peak estimation filters 1003a-d to respective clipping blocks 1008a-d are simply delayed versions of cx1 samples that are clipped and correspond to the encircled A signal in FIG. 7. Pulse shaping occurs at blocks 1002a-d, receiving values from clipping blocks 1008a-d.

The present design may therefore include, but is not limited to, selectively clipping waveforms prior to transmission in a multi-carrier wireless communication system, including estimating peak values for signals to be transmitted over multiple carriers in the multi-carrier wireless communication system, determining a local threshold set comprising one local threshold for each carrier in the multi-carrier wireless communication system based on a total threshold representing a maximum aggregate signal level for a sum of all signals to be transmitted over the multiple carriers in the multi-carrier wireless communication system, and clipping one signal to be transmitted over one carrier in the multi-carrier wireless communication system when the signal to be transmitted over the one carrier exceeds a corresponding local threshold and all signals to be transmitted over multiple carriers exceeds the total threshold.

Alternately, the design may be considered to include estimating peak signal values for signals to be transmitted in the multi-carrier wireless communication system, and selectively clipping any signal wherein at least one peak signal value exceeds a local threshold and peak signal values for a sum of all signals to be transmitted exceed a global threshold.

Those of skill in the art will recognize that the step of a method described in connection with an embodiment may be interchanged without departing from the scope of the invention. Those of skill in the art would also understand that information and signals may be represented using any of a variety of different technologies and techniques. For example, data, data packets, packet groups, instructions, commands, information, signals, and bits that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. The design may include a computer readable medium or media configured to execute a set of instructions that when executed perform a method according to the teachings disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of selectively clipping waveforms prior to transmission in a multi-carrier wireless communication system, comprising:
   estimating peak values for signals to be transmitted over multiple carriers in the multi-carrier wireless communication system;
   determining a local threshold set comprising one local threshold for each carrier in the multi-carrier wireless communication system based on a configurable total threshold representing a maximum aggregate signal level for a sum of all signals to be transmitted over the multiple carriers in the multi-carrier wireless communication system; and
   clipping one signal to be transmitted over one carrier in the multi-carrier wireless communication system when the signal to be transmitted over the one carrier exceeds a corresponding local threshold and a sum of all signals to be transmitted over multiple carriers exceeds the total threshold;
   wherein estimating peak values, determining the local threshold set, and clipping one signal occur of carrier frequencies of the multiple carriers.

2. The method of claim 1, further comprising:
   estimating peak values for a plurality of phases for each of the plurality of signals;
   summing peak values for each phase for the plurality of signals; and
   selecting a signal value for one phase for the plurality of signals having maximum value, wherein said clipping one signal to be transmitted comprises clipping the one signal to be transmitted when the signal value exceeds the local threshold.

3. The method of claim 1, wherein determining the local threshold uses a threshold computing engine configured to compute the local threshold based on a global threshold.

4. The method of claim 3, wherein determining the local threshold further comprises determining one phase from multiple phases exhibiting a maximum peak value and comparison of the maximum peak value to the global threshold, 5. The method of claim 4, wherein the threshold computing engine determines a local threshold for one carrier and the clipping comprises:
   receiving one carrier signal for the one carrier and a local threshold computed by the threshold computing engine for the one carrier; and
   clipping the one carrier signal wherein the local threshold exceeds an amplitude of the one carrier signal.

6. The method of claim 2, wherein estimating peak values for the plurality of phases for each of the plurality of signals comprises:
   receiving a carrier signal comprising multiple samples;
   delaying each of the samples to create a plurality of delayed samples;
   performing peak phase estimation for each phase of the carrier signal based on the plurality of delayed samples; and
   determining a magnitude of peaks for each phase of the carrier signal.

7. The method of claim 6, further comprising:
   summing the magnitude of peaks for each phase of the carrier signal with at least one magnitude of peaks for identical phases of other carrier signals in the multi-carrier wireless network.

8. The method of claim 1, further comprising adjusting at least one local threshold such that amount of clipping done per carrier is based on power differential between carriers.

9. A method of selectively clipping at least one signal prior to transmission in a multi-carrier wireless communication system, comprising:
   determining peak signal values for signals to be transmitted in the multi-carrier wireless communication system; and
   selectively clipping any signal wherein at least one peak signal value exceeds a local threshold and peak signal values for a sum of all signals to be transmitted exceed a global threshold;
   wherein the determining peak values and selectively clipping any signal occur independently of carrier frequencies of carriers in the multi-carrier wireless communication system.

10. The method of claim 9, further comprising:
    estimating peak values for a plurality of phases for each signal to be transmitted;
    summing peak values for each phase for each signal to be transmitted; and
    selecting a signal value for one phase for the signals to be transmitted having maximum value, wherein said selectively clipping comprises clipping one signal to be transmitted when the signal value for the one signal to be transmitted exceeds the local threshold.

11. The method of claim 9, further comprising determining the local threshold using a threshold computing engine configured to compute the local threshold based on a global threshold.

12. The method of claim 11, wherein determining the local threshold further comprises determining one phase from multiple phases exhibiting a maximum peak value and comparing the maximum peak value to the global threshold.

13. The method of claim 12, wherein the threshold computing engine determines a local threshold for one carrier and selectively clipping comprises:
    receiving one carrier signal for the one carrier and a local threshold computed by the threshold computing engine for the one carrier; and
    clipping the one carrier signal wherein the local threshold exceeds an amplitude of the one carrier signal.

14. The method of claim 10, wherein estimating peak values for the plurality of phases for each of the plurality of signals comprises:
    receiving a carrier signal comprising multiple samples;
    delaying each of the samples to create a plurality of delayed samples;
    performing peak phase estimation for each phase of the carrier signal based on the plurality of delayed samples; and
    determining a magnitude of peaks for each phase of the carrier signal.

15. The method of claim 14, further comprising:
    summing the magnitude of peaks for each phase of the carrier signal with at least one magnitude of peaks for identical phases of other carrier signals in the multi-carrier wireless network.

16. The method of claim 9, further comprising adjusting at least one local threshold such that amount of clipping done per carrier is based on power differential between carriers.

17. An apparatus for selectively clipping waveforms prior to transmission in a multi-carrier wireless communication system, comprising:
    means for estimating peak values for signals to be transmitted over multiple carriers in the multi-carrier wireless communication system;
    means for determining a local threshold set comprising one local threshold for each carrier in the multi-carrier wireless communication system based on a configurable total threshold representing a maximum aggregate signal level for a sum of all signals to be transmitted over the multiple carriers in the multi-carrier wireless communication system; and
    means for clipping one signal to be transmitted over one carrier in the multi-carrier wireless communication system when the signal to be transmitted over the one carrier exceeds a corresponding local threshold and all signals to be transmitted over multiple carriers exceeds the total threshold;
    wherein the means for estimating peak values, means for determining the local threshold set, and means for clipping one signal operate independently of carrier frequencies of the multiple carriers.

18. The apparatus of claim 17, further comprising:
    means for estimating peak values for a plurality of phases for each of the plurality of signals;
    means for summing peak values for each phase for the plurality of signals; and
    means for selecting a signal value for one phase for the plurality of signals having maximum value, wherein said clipping one signal to be transmitted comprises clipping the one signal to be transmitted when the signal value exceeds the local threshold.

19. The apparatus of claim 17, wherein the means for determining the local threshold comprise a threshold computing engine configured to compute the local threshold based on a global threshold.

20. The apparatus of claim 19, wherein the means for determining the local threshold further comprises means for determining one phase from multiple phases exhibiting a maximum peak value and comparison of the maximum peak value to the global threshold.

21. The apparatus of claim 20, wherein the threshold computing engine determines a local threshold for one carrier and the means for clipping comprise:
    means for receiving one carrier signal for the one carrier and a local threshold computed by the threshold computing engine for the one carrier; and
    means for clipping the one carrier signal wherein the local threshold exceeds an amplitude of the one carrier signal.

22. The apparatus of claim 18, wherein the means for estimating peak values for the plurality of phases for each of the plurality of signals comprises:
    means for receiving a carrier signal comprising multiple samples;
    means for delaying each of the samples to create a plurality of delayed samples;

means for performing peak phase estimation for each phase of the carrier signal based on the plurality of delayed samples; and means for determining a magnitude of peaks for each phase of the carrier signal.

23. The apparatus of claim 22, further comprising:
means for summing the magnitude of peaks for each phase of the carrier signal with at least one magnitude of peaks for identical phases of other carrier signals in the multi-carrier wireless network.

24. The apparatus of claim 17, further comprising means for adjusting at least one local threshold such that amount of clipping done per carrier is based on power differential between carriers.

25. An apparatus for selectively clipping at least one signal prior to transmission in a multi-carrier wireless communication system, comprising:
means for determining peak signal values for signals to be transmitted in the multi-carrier wireless communication system; and
means for selectively clipping any signal wherein at least one peak signal value exceeds a local threshold and peak signal values for a sum of all signals to be transmitted exceed a global threshold;
wherein the means for determining peak signal values and means for selectively clipping any signal operate independently of carrier frequencies of carriers in the multi-carrier wireless communication system.

26. The apparatus of claim 25, further comprising:
means for estimating peak values for a plurality of phases for each signal to be transmitted;
means for summing peak values for each phase for each signal to be transmitted; and
means for selecting a signal value for one phase for the signals to be transmitted having maximum value, wherein said means for selectively clipping comprises means for clipping one signal to be transmitted when the signal value for the one signal to be transmitted exceeds the local threshold.

27. The apparatus of claim 25, further comprising means for determining the local threshold using a threshold computing engine configured to compute the local threshold based on a global threshold.

28. The apparatus of claim 27, wherein the means for determining the local threshold further comprise means for determining one phase from multiple phases exhibiting a maximum peak value and comparison of the maximum peak value to the global threshold.

29. The apparatus of claim 28, wherein the threshold computing engine determines a local threshold for one carrier and the means for selectively clipping comprise:
means for receiving one carrier signal for the one carrier and a local threshold computed by the threshold computing engine for the one carrier; and
means for clipping the one carrier signal wherein the local threshold exceeds an amplitude of the one carrier signal.

30. The apparatus of claim 26, wherein the means for estimating peak values for the plurality of phases for each of the plurality of signals comprise:
means for receiving a carrier signal comprising multiple samples;
means for delaying each of the samples to create a plurality of delayed samples;
means for performing peak phase estimation for each phase of the carrier signal based on the plurality of delayed samples; and
means for determining a magnitude of peaks for each phase of the carrier signal.

31. The apparatus of claim 30, further comprising:
means for summing the magnitude of peaks for each phase of the carrier signal with at least one magnitude of peaks for identical phases of other carrier signals in the multi-carrier wireless network.

32. The apparatus of claim 25, further comprising means for adjusting at least one local threshold such that amount of clipping done per carrier is based on power differential between carriers.

33. An apparatus for selectively clipping waveforms prior to transmission in a multi-carrier wireless communication system, comprising:
a computing device configured to:
estimate peak values for signals to he transmitted over multiple carriers in the multi-carrier wireless communication system and
determine a local threshold set comprising one local threshold for each carrier in the multi-carrier wireless communication system based on a configurable total threshold representing a maximum aggregate signal level for a sum of all signals to be transmitted over the multiple carriers in the multi-carrier wireless communication system; and
a clipping arrangement configured to clip one signal to be transmitted over one carrier in the multi-carrier wireless communication system when the signal to he transmitted over the one carrier exceeds a corresponding local threshold and all signals to be transmitted over multiple carriers exceeds the total threshold;
wherein the computing device and the clipping arrangement operate independently of carrier frequencies of the multiple carriers.

34. The apparatus of claim 33, wherein the computing device is further configured to:
estimate peak values for a plurality of phases for each of the plurality of signals;
sum peak values for each phase for the plurality of signals; and
select a signal value for one phase for the plurality of signals having maximum value;
wherein said clipping arrangement is configured to clip the one signal to be transmitted when the signal value exceeds the local threshold.

35. The apparatus of claim 33, wherein the computing device comprises a threshold computing engine configured to compute the local threshold based on a global threshold.

36. The apparatus of claim 35, wherein the computing device is further configured to determine one phase from multiple phases exhibiting a maximum peak value and compare the maximum peak value to the global threshold.

37. The apparatus of claim 36, wherein the threshold computing engine determines a local threshold for one carrier and the clipping device is configured to:
receive one carrier signal for the one carrier and a local threshold computed by the threshold computing engine for the one carrier; and
clip the one carrier signal wherein the local threshold exceeds an amplitude of the one carrier signal.

38. The apparatus of claim 34, wherein the computing device is further configured to:
receive a carrier signal comprising multiple samples;
delay each of the samples to create a plurality of delayed samples;
perform peak phase estimation for each phase of the carrier signal based on the plurality of delayed samples; and determine a magnitude of peaks for each phase of the carrier signal, 39. The apparatus of claim 38, further comprising:
a summer arrangement configured to sum the magnitude of peaks for each phase of the carrier signal with at least one magnitude of peaks for identical phases of other carrier signals in the multi-carrier wireless network.

40. The apparatus of claim 33, wherein the processing device is further configured to adjust at least one local threshold such that amount of clipping done per carrier is based on power differential between carriers.

41. An apparatus for selectively clipping at least one signal prior to transmission in a multi-carrier wireless communication system, comprising:
a computing device configured to determine peak signal values for signals to be transmitted in the multi-carrier wireless communication system; and
a clipping arrangement configured to selectively clip any signal wherein at least one peak signal value exceeds a local threshold and peak signal values for a sum of all signals to be transmitted exceed a global threshold;
wherein the computing device and the clipping arrangement operate independently of carrier frequencies of carriers in the multi-carrier wireless communication system.

42. The apparatus of claim 41, wherein the computing device is configured to:
estimate peak values for a plurality of phases for each signal to be transmitted;
sum peak values for each phase for each signal to be transmitted; and
select a signal value for one phase for the signals be transmitted having maximum value;
wherein the clipping arrangement is configured to clip one signal to be transmitted when the signal value for the one signal to be transmitted exceeds the local threshold.

43. The apparatus of claim 41, further comprising a threshold. computing engine configured to compute the local threshold based on a global threshold.

44. The apparatus of claim 43, wherein the computing device is further configured to determine one phase from multiple phases exhibiting a maximum peak value and compare of the maximum peak value to the global threshold.

45. The apparatus of claim 44, wherein the threshold computing engine determines a local threshold for one carrier and the clipping arrangement is configured to:
receive one carrier signal for the one carrier and a local threshold computed by the threshold computing engine for the one carrier; and
clip the one carrier signal wherein the local threshold exceeds an amplitude of the one carrier signal.

46. The apparatus of claim 42, wherein the computing device is further configured to:
receive a carrier signal comprising multiple samples;
delay each of the samples to create a plurality of delayed samples;
perform peak phase estimation for each phase of the carrier signal based on the plurality of delayed samples; and
determine a magnitude of peaks for each phase of the carrier signal.

47. The apparatus of claim 46, further comprising:
a summing arrangement configured to sum the magnitude of peaks for each phase of the carrier signal with at least one magnitude of peaks for identical phases of other carrier signals in the multi-carrier wireless network.

48. The apparatus of claim 41, wherein the computing device is further configured to adjust at least one local threshold such that amount of clipping done per carrier is based on power differential between carriers.

49. A non-transitory computer readable medium configured to execute a set of instructions that when executed perform a method of selectively clipping waveforms prior to transmission in a multi-carrier wireless communication system, the method comprising:
estimating peak values for signals to be transmitted over multiple carriers in the multi-carrier wireless communication system;
determining a local threshold set comprising one local threshold for each carrier in the multi-carrier wireless communication system based on a configurable total threshold representing a maximum aggregate signal level for a sum of all signals to be transmitted over the multiple carriers in the multi-carrier wireless communication system; and
clipping one signal to be transmitted over one carrier in the multi-carrier wireless communication system when the signal to be transmitted over the one carrier exceeds a corresponding local threshold and all signals to be transmitted over multiple carriers exceeds the total threshold;
wherein the estimating peak values, determining the local threshold set, and clipping one signal occur independently of carrier frequencies of the multiple carriers.

50. A non-transitory computer readable medium configured to execute a set of instructions that when executed perform a method of selectively clipping at least one signal prior to transmission in a multi-carrier wireless communication system, the method comprising:
determining peak signal values for signals to be transmitted in the multi-carrier wireless communication system; and
selectively clipping any signal wherein at least one peak signal value exceeds a local threshold and peak signal values for a sum of all signals to be transmitted exceed a global threshold;
wherein the determining peak signal values and selectively clipping any signal occur independently of carrier frequencies of carriers in the multi-carrier wireless communication system.

* * * * *